(12) United States Patent
Darabi

(10) Patent No.: US 7,567,628 B2
(45) Date of Patent: Jul. 28, 2009

(54) SYMMETRIC DIFFERENTIAL SLICER

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 676 days.

(21) Appl. No.: 11/055,935

(22) Filed: Feb. 11, 2005

(65) Prior Publication Data

US 2006/0126759 A1  Jun. 15, 2006

Related U.S. Application Data

(60) Provisional application No. 60/635,701, filed on Dec. 13, 2004.

(51) Int. Cl.
*H04L 25/06* (2006.01)

(52) U.S. Cl. ............. 375/318; 326/37; 326/60; 326/82; 326/86; 327/52; 327/65; 327/66; 327/77; 327/89; 327/108; 327/307; 327/389; 327/437; 327/543; 330/252; 330/253; 330/261; 330/264; 330/267

(58) Field of Classification Search ............... 327/65
See application file for complete search history.

(56) References Cited

U.S. PATENT DOCUMENTS

| | | | | |
|---|---|---|---|---|
| 5,953,276 A * | 9/1999 | Baker | ............... | 365/208 |
| 6,252,435 B1 * | 6/2001 | Wu et al. | ............... | 327/65 |
| 6,897,705 B2 * | 5/2005 | Idei et al. | ............... | 327/333 |
| 7,248,081 B2 * | 7/2007 | Mohammadi et al. | ......... | 327/65 |
| 7,248,115 B2 * | 7/2007 | Nishimura | ............... | 330/253 |

* cited by examiner

*Primary Examiner*—Shuwang Liu
*Assistant Examiner*—Dhaval Patel

(57) ABSTRACT

A self-biasing slicer includes a self-biased differential transistor pair. As a result of the self-biasing, the slicer may receive input signals without the use of AC coupling. That is, a differential input signal may be fed directly to the inputs of the differential transistor pair. The differential pair circuit may incorporate a self-biased load and a self-biased current source. The slicer also may include a matched output stage with inverters that provide a rail-to-rail output. Here, the inverters may incorporate components that are matched with components of the differential pair.

10 Claims, 3 Drawing Sheets

SYMMETRIC DIFFERENTIAL SLICER

CROSS-REFERENCE TO RELATED APPLICATION(S)

This application claims the benefit of U.S. Provisional Patent Application No. 60/635,701, filed Dec. 13, 2004, the disclosure of which is hereby incorporated by reference herein.

TECHNICAL FIELD

This application relates to signal processing and, more specifically, to a signal slicer.

BACKGROUND

A conventional slicer converts an analog input signal into a rail-to-rail (e.g., digital) output signal. For example, the slicer may incorporate a threshold detection mechanism to generate a digital high or low output signal when the value of the input signal corresponds to a high or low threshold value, respectively. A typical differential slicer generates a high or low output signal based on the zero crossing of the differential input signal.

In many applications the input signal may include a DC component (e.g., a common mode voltage level of a differential input signal). In this case, provisions may be made to insure that the correct threshold value is used to slice the input signal.

A typical conventional slicer incorporates a self-biasing resistor and an AC coupling capacitor. Here, the capacitor removes the DC component of the input signal. In addition, the self-biasing property of the inverter adjusts the DC level of the input signal to a level that causes the output of the inverter to switch when the input signal is at the appropriate level.

In many applications relatively large capacitors and resistors are needed for such a slicer. As a result, this type of slicer may be impractical for some applications.

In addition, these types of slicers may have high pass filtering properties. That is, they may not efficiently process low frequency signals. Accordingly, a need exists for improved slicing circuits.

SUMMARY

The invention relates to a symmetric differential slicer. For convenience, an embodiment of a system constructed or a method practiced according to the invention may be referred to herein simply as an "embodiment."

In one aspect of the invention a self-biasing slicer may be used to slice an input signal without requiring AC coupling of the input signal to the slicer. For example, a differential input signal may be fed directly to the inputs of a differential transistor pair.

In one aspect of the invention a slicer comprises a self-biased differential pair. For example, the differential pair may incorporate a self-biased load. In addition, the differential pair may incorporate a self-biased current source.

In one aspect of the invention a slicer comprises an output stage with inverters that provide a rail-to-rail output. In some embodiments the inverters may incorporate components that are matched with components of the differential pair. For example, one of the transistors in an inverter may match a current source transistor of the differential pair. In addition, another one of the transistors in the inverter may match a load transistor of the differential pair. Here, matching characteristics of the transistors may include, for example, size, type and operating parameters.

A slicer constructed in accordance with the invention may be designed to operate at very low frequencies (e.g., close to DC) and may be designed to operate at hundreds of MHz (e.g., 300 MHz or more). In addition, the slicer may accurately track process, voltage and/or temperature variations. Moreover, the above may be accomplished while providing a symmetric output signal (e.g., with a substantially 50% duty cycle).

BRIEF DESCRIPTION OF THE DRAWINGS

These and other features, aspects and advantages of the present invention will be more fully understood when considered with respect to the following detailed description, appended claims and accompanying drawings, wherein:

Figure 1:
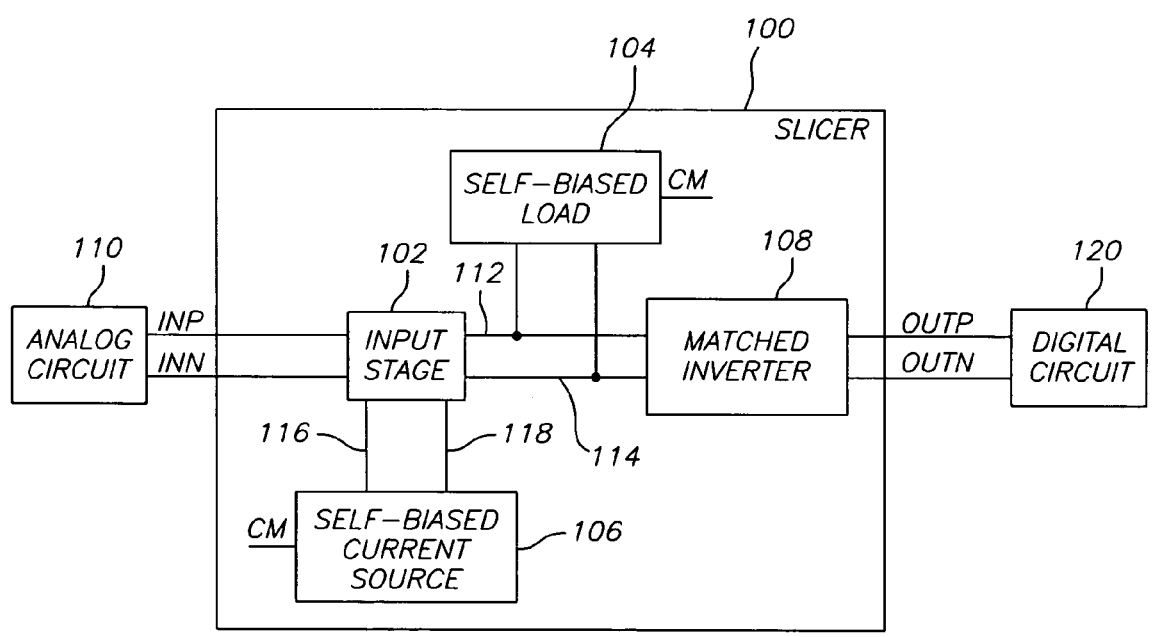
FIG. 1 is a simplified block diagram of one embodiment of a slicer constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 is a simplified block diagram of one embodiment of a symmetric differential self-biasing slicer 100. The slicer 100 includes a differential input stage 102, a self-biased load 104, a self-biased current source 106 and a matched inverter 108.

Figure 2:
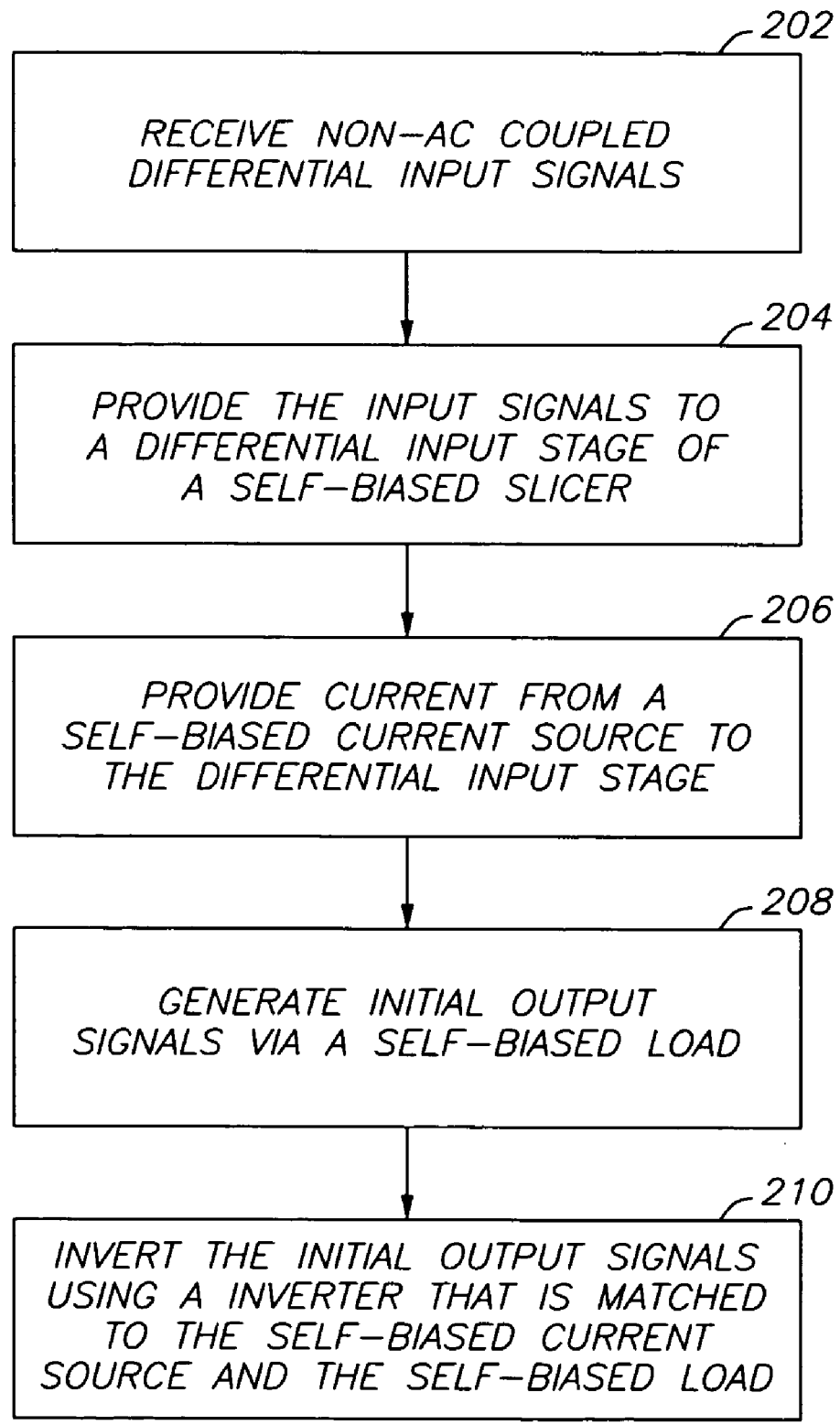
FIG. 2 is a flow chart of one embodiment of slicing operations that may be performed in accordance with the invention.

One embodiment of the operations of the slicer will be described in conjunction with the flowchart of FIG. 2. As represented by block 202, the slicer 100 receives a differential input signal from an analog circuit 110 via leads INP and INN. As FIG. 1 illustrates, the slicer 100 may not be AC coupled (e.g., via capacitors) to the analog circuit 110.

As represented by block 204, the differential input signal is coupled to the differential input stage 102 of the slicer 100. In some embodiments the input stage comprises a differential transistor pair.

As represented by block 206, the current source 106 provides current for the input stage 102 via leads 116 and 118. In some embodiments the current source 106 provides a sink current for each leg of the differential pair in the input stage. Each leg of the current source may comprise, for example, one or more transistors controlled by one or more bias voltages.

The input stage 102 provides common-mode rejection of the differential input signal. As represented by block 208, in conjunction with the self-biased load 104, the input stage 102 generates an initial output signal (e.g., a self-biased differential output signal) on leads 112 and 114.

In some embodiments a common mode signal CM is generated by the self-biased load 104 as described below. In some embodiments this common mode signal CM controls the magnitude of the current provided by the current source 106.

As represented by block 210, the matched inverter 108 inverts the signals from leads 112 and 114 to provide the output signals OUTP and OUTN to, for example, a digital circuit 120. The self-biased output signal 112 and 114 effectively adjusts the DC level of the inverter 108. As described herein, in some embodiments the components of the inverter 108 may be matched to the components of the current source 106 and load 104.

Figure 3:
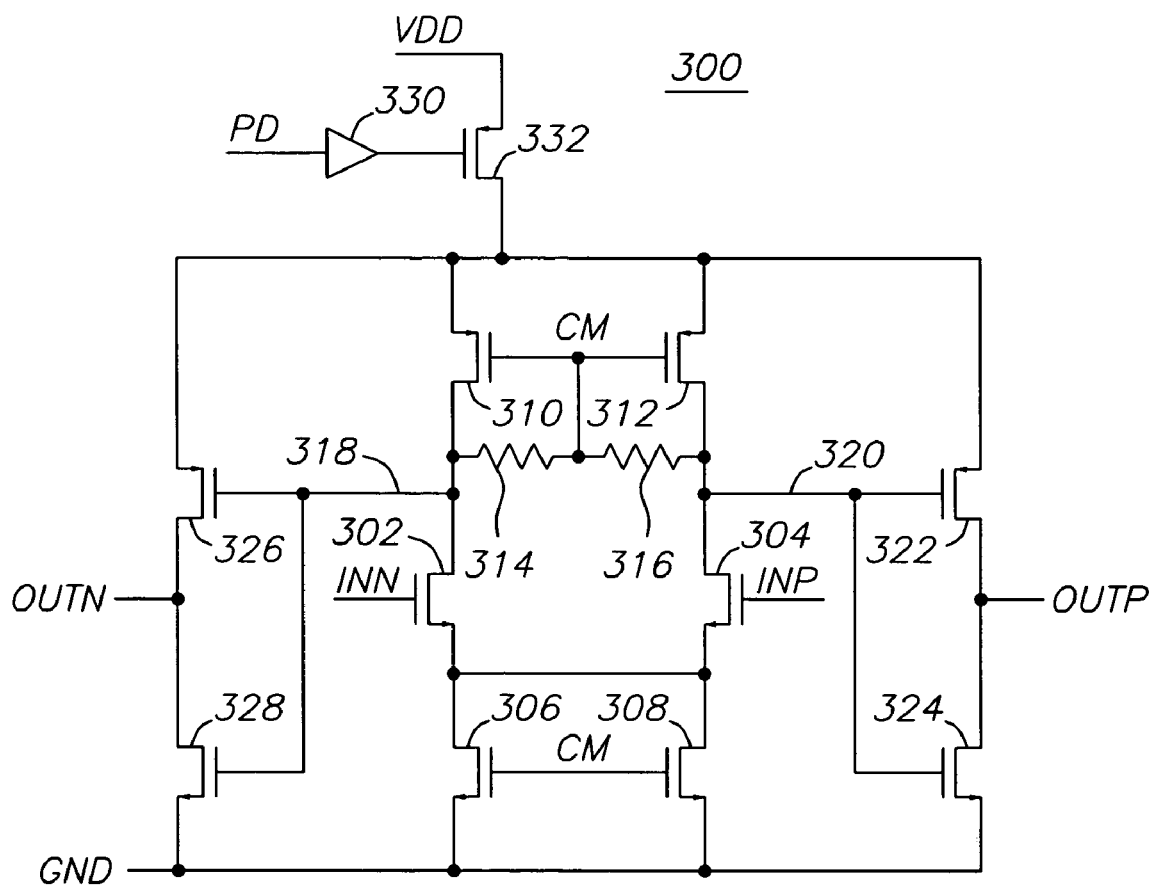
FIG. 3 is a simplified schematic diagram of one embodiment of a slicer constructed in accordance with the invention.

FIG. 3 is a simplified schematic diagram of one embodiment of a symmetric differential slicer 300 constructed in accordance with the invention. A differential analog input signal (leads INP and INN) drives a differential transistor pair comprising transistors 302 and 304. A current source including transistors 306 and 308 provides, in this example, a sink current for the differential pair.

The load for the differential pair includes transistors 310 and 312 and resistors 314 and 316 (e.g., 4 KΩ). The configuration illustrated in FIG. 3 provided a self-biasing load that biases the gates of the load transistors 310 and 312 at level CM. The differential output of the differential pair is provided on leads 318 and 320.

This differential output is then inverted by a pair of inverters consisting of transistors 322 and 324 and transistors 326 and 328, respectively. That is, a first leg (e.g., lead 318) of the initial differential output signal is inverted by transistor pair 326 and 328. A second leg (e.g., lead 320) of the initial differential output signal is inverted by transistor pair 322 and 324.

Typically, the transistors in each inverter have a size difference of two to three times. For example, transistor 326 may be twice as large as transistor 328. The inverters generate a rail-to-rail differential output signal on leads OUTP and OUTN.

In some embodiments the current source is not biased using an external bias voltage. Rather, as shown in FIG. 3, the bias level CM generated by the self-biasing load controls the magnitude of the current flowing though the current source. Thus, the current source transistors 306 and 308 are biased at the same voltage level as the load transistors 310 and 312.

In some embodiments the transistors in the inverters are matched to the transistors of the self-biasing differential pair circuit. For example, inverter transistor 326 may have the same size and characteristics as load transistor 310. Inverter transistor 322 may have the same size and characteristics as load transistor 312. Inverter transistor 328 may have the same size and characteristics as current source transistor 306. Inverter transistor 324 may have the same size and characteristics as current source transistor 308.

Due to this matching of the inverter with the loading and the current bias of the differential circuit, the differential pair circuit will generate the proper common mode level on leads 318 and 320. That is, the differential pair circuit will adjust the common mode level on leads 318 and 320 such that the inverters may switch at the correct point (e.g., when the input signal INP, INN is at its zero crossing). As a result, the common mode level of the input INP, INN may not affect the common mode level of the output OUTP, OUTN. Consequently, the inverter may generate an output signal with a substantially 50% duty cycle.

In some embodiments the slicer may be selectively turned on and off. For example, an inverting buffer 330 and a transistor 332 may be used to control whether the supply voltage VDD is provided to the load and inverters.

It should be appreciated that the various components described herein may be used in a circuit independently of the other components. For example, a circuit incorporating the teachings herein may include various combinations of these components. Thus, not all of the components described herein may be employed in every such circuit.

The teachings of the inventions may be incorporated into a variety of circuits. For example, the slicer may be used in a communications receiver to slice a received signal.

Different embodiments of the invention may be implemented using a variety of processes. For example, in some embodiments CMOS processes may be used to implement a circuit. However, it should be understood that other processes may be used to implement a circuit.

The components and functions described herein may be connected/coupled in many different ways. The manner in which this is done may depend, in part, on whether the components are separated from the other components. In some embodiments some of the connections represented by the lead lines in the drawings may be in an integrated circuit or on a circuit board.

The signals discussed herein may take several forms. For example, in some embodiments a signal may be an electrical signal transmitted over a wire. A signal may comprise more than one signal. For example, a signal may consist of a series of signals. Also, a differential signal comprises two complementary signals or some other combination of signals. Thus, a group of signals may be collectively referred to herein as a signal.

The components and functions described herein may be connected/coupled directly or indirectly. Thus, in some embodiments there may or may not be intervening devices (e.g., buffers) between connected/coupled components.

In summary, the invention described herein generally relates to an improved slicer circuit. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A symmetric differential slicer comprising:
 a differential transistor pair configured to receive a differential input signal;
 a first transistor pair with coupled gate leads configured to provide current for each transistor of the differential transistor pair;
 a second transistor pair with coupled gate leads, the second transistor pair coupled to the differential transistor pair to provide an initial differential output signal;
 a third transistor pair with coupled gate leads configured to receive a first leg of the initial differential output signal to provide a first leg of an inverted differential output signal; and a fourth transistor pair with coupled gate leads configured to receive a second leg of the initial differential output signal to provide a second leg of the inverted differential output signal.

2. The symmetric differential slicer of claim 1 wherein the second transistor pair provides a common mode signal at its coupled gate leads.

3. The symmetric differential slicer of claim 2 wherein the common mode signal is coupled to the coupled gate leads of the first transistor pair.

4. The symmetric differential slicer of claim 1 wherein drain leads of the first transistor pair are coupled to source leads of the differential transistor pair.

5. The symmetric differential slicer of claim 4 wherein the drain leads of the first transistor pair are coupled together.

6. The symmetric differential slicer of claim 1 wherein the second transistor pair comprises a pair of resistors respectively coupled between the coupled gate leads and each source lead of the second transistor pair.

7. The symmetric differential slicer of claim 6 wherein the source leads of the second transistor pair are coupled to drain leads of the differential transistor pair.

8. The symmetric differential slicer of claim 1 wherein:
a drain lead of a first transistor of the third transistor pair is coupled to a source lead of a second transistor of the third transistor pair; and
a drain lead of a first transistor of the fourth transistor pair is coupled to a source lead of a second transistor of the fourth transistor pair.

9. The symmetric differential slicer of claim 1 wherein the third transistor pair and the fourth transistor pair each comprise:
at least one transistor that is matched to at least one transistor in the first transistor pair; and
at least one transistor that is matched to at least one transistor in the second transistor pair.

10. The symmetric differential slicer of claim 1 wherein the differential output signal comprises a rail-to-rail signal.

* * * * *